United States Patent [19]

Beckley et al.

[11] Patent Number: 5,709,280

[45] Date of Patent: Jan. 20, 1998

[54] SEALED LEAD-ACID CELL TRAY ASSEMBLY AND MOTIVE POWERED VEHICLE USING SUCH CELL TRAY ASSEMBLY

[75] Inventors: Gordon C. Beckley, West Chicago; Kwok K. Chan, Morton Grove; George Romas, Chicago Heights, all of Ill.

[73] Assignee: GNB Technologies, Inc., Lombard, Ill.

[21] Appl. No.: 542,732

[22] Filed: Oct. 13, 1995

[51] Int. Cl.$^6$ ................................................ B60R 16/04
[52] U.S. Cl. .......................................................... 180/68.5
[58] Field of Search ................................ 180/65.1, 65.3, 180/68.5; 224/902; 429/99; 29/730

[56] References Cited

U.S. PATENT DOCUMENTS

| | | | |
|---|---|---|---|
| 3,167,458 | 1/1965 | Brazell | 180/68.5 |
| 3,821,997 | 7/1974 | Sieren | 180/68.5 |
| 4,042,054 | 8/1977 | Ward | 180/68.5 |
| 4,756,978 | 7/1988 | Nitcher et al. | 180/68.5 |
| 4,957,829 | 9/1990 | Holl | 429/99 |
| 5,015,545 | 5/1991 | Brooks | 180/68.5 |
| 5,140,744 | 8/1992 | Miller | 29/730 |
| 5,378,555 | 1/1995 | Waters et al. | 180/68.5 |
| 5,437,939 | 8/1995 | Beckley | 180/68.5 |

FOREIGN PATENT DOCUMENTS

3150652   6/1983   Germany ................ 180/65.1

*Primary Examiner*—Kevin Hurley
*Assistant Examiner*—Frank Vanaman
*Attorney, Agent, or Firm*—Leydig, Voit & Mayer, Ltd.

[57] ABSTRACT

A sealed lead-acid tray assembly for a motive-powered vehicle such as, for example, a Class 1–3 truck, comprises a bottom tray with a base, side and back walls defining a lower and an upper cell-receiving space and a first set of short sealed lead-acid cells, typically having a height of no more than about 14 inches, vertically positioned in the lower cell-receiving space, a top tray support structure positioned in the bottom tray, and a top tray located on the top tray support and having a second set of short sealed lead-acid cells in the top tray which is located in the upper cell-receiving space of the bottom tray, the respective cells being suitably electrically connected together.

20 Claims, 7 Drawing Sheets

SEALED LEAD-ACID CELL TRAY ASSEMBLY AND MOTIVE POWERED VEHICLE USING SUCH CELL TRAY ASSEMBLY

BACKGROUND OF THE INVENTION

1. Field of the Invention

This invention relates to lead-acid cells and batteries and, more particularly, to a cell tray assembly for sealed, maintenance-free, lead-acid cells used in motive power applications.

2. Description of the Prior Art

The advantages that are provided by sealed lead-acid cells and batteries in comparison to conventional, flooded lead-acid batteries are substantial and varied. Sealed lead-acid technology thus offers substantial benefits by eliminating maintenance (e.g., cell watering), expense (e.g., acid purchases), environmental (e.g., expensive waste treatment systems and air-borne acid mist) and safety (e.g., acid burns) concerns.

It is thus not surprising that sealed lead-acid cells and batteries are widely used in commerce today for various applications that have widely differing requirements. In stationary battery applications, the sealed lead-acid batteries provide stand-by power in the event of a power failure. For this type of application, such stationary batteries are maintained at a full state-of-charge and in a ready-to-use condition, typically by floating at a constant preset voltage. Stationary batteries are used for stand-by or operational power in a wide variety of applications, including, by way of illustration, telecommunications, utilities, for emergency lighting in commercial buildings, as stand-by power for cable television systems, and in uninterruptible power supplies.

Uninterruptible power supplies are systems that back-up computers and communications networks. Sealed lead-acid batteries may comprise the power source. The uninterruptible power source allows for the orderly shut-down of computers when there is a sudden interruption in the primary cycle source, such as during a power outage, and provides back-up power for communications networks. The uninterruptible power supply also will accommodate short, or intermittent, losses in power. When there is a power interruption, the batteries in the uninterruptible power system can be subject to rapid discharge.

Numerous stationary power applications require anywhere from 6 to 120 cells or even more. Accordingly, floor space, and sometimes even the height, required for the batteries can present problems. To attempt to minimize the floor space required, it is conventional to position the batteries in various kinds of racks or cabinets.

Another potential application for sealed lead-acid cells and batteries is a variety of motive power applications in which an array of cells or batteries provides the motive power for vehicles ranging from Class 1 to Class 3 trucks, various automated guided vehicles, mining vehicles and also railroad locomotives.

A variety of design circumstances for motive power applications serves to complicate the situation. Thus, on the one hand, in Class 1 and 2 trucks, i.e., electric rider trucks and electric narrow aisle trucks, respectively, the array of cells or batteries utilized have weight limits that must be met so as to provide the necessary counterbalance for the vehicle. On the other hand, less weight is preferred for Class 3 electric hand trucks since less energy is involved, as long as the appropriate motive power requirements are met.

Also, the physical space available for the motive power source in Class 1 and 2 trucks is often limited. Indeed, the space for the motive power source is often confined so that a maximum space is defined. Still further, in the case of the Class 3 electric hand trucks (often termed "pallet jacks"), there is a height limitation requirement. Accordingly, for safety and practical operational reasons, it is very highly desirable that the operator of the pallet jack be able to see the end of the truck forks. This requirement thus dictates a practical upper limit for the height of the motive power source since the power source is almost always positioned between the operator and the forks.

The performance requirements for motive-powered vehicles are quite different from the performance requirements for stationary battery power sources. In stationary applications, the depth of discharge in service is relatively shallow, and the number of discharges is small, as most batteries are in float service. In direct contrast, motive power applications require relatively deep depths of discharge to be achieved on a continuous cycling basis over a period of time. Indeed, a common requirement for Class 1–3 trucks is that, in an 8-hour shift, the cell or battery assembly must be capable of delivering an 80% depth of discharge and that performance is required for about 300 cycles per year with a useful service life under those conditions of 4 or 5 years.

Using sealed lead-acid cells and batteries in motive power applications would offer substantial advantages over the use of flooded lead-acid batteries. Sealed lead-acid cells and batteries thus allow opportunity charging (i.e., charging for short periods of time when the vehicle is not in service) while such charging could not be satisfactorily used with flooded lead-acid batteries. Sealed lead-acid cells and batteries typically offer a more durable product, due to less shedding of active material and for other reasons. Sealed lead-acid cells and batteries offer improved performance for cold storage applications and the like in comparison to that of flooded lead-acid batteries. Cell watering, periodically needed in the maintenance of flooded lead-acid batteries, is difficult to carry out in some applications because the battery is relatively inaccessible. Indeed, the overall expenses for maintaining flooded lead-acid batteries for their useful service life can be substantial.

U.S. Pat. No. 5,441,123 to Beckley discloses a sealed lead-acid cell tray assembly for powering a vehicle characterized by the ability to provide a vastly superior cycle life under regimes requiring relatively deep depths of discharge. The tray assembly comprises a tray base and upstanding tray side walls that are connected to the base. The base and the side walls are dimensionally configured to provide a cell enclosure area having the ability to accept at least six sealed lead-acid cells in a horizontal position. The enhanced cycle life that results allows sealed lead-acid batteries to at least meet the performance benefits now achieved using conventional, flooded lead-acid batteries in motive power applications. Indeed, the sealed lead-acid cell tray assembly shown in the '123 patent has achieved commercial acceptance which is considered to be outstanding.

However, one difficulty which has arisen is a fitment issue, particularly with Class 1 and 2 vehicles. More particularly, there are a relatively large number of manufacturers of these types of vehicles, and the size of the battery compartments that are present often varies. Indeed, the configuration of the battery compartment in such vehicles have been designed for cells which are oriented in a vertical orientation, typically for fitting flooded conventional lead-acid batteries. The problem which results when using the approach of the '123 patent is that the varying compartment sizes, particularly in Class 1 and 2 vehicles, requires a relatively large number of cell sizes that would have to be manufactured to develop coverage for all, or essentially all, of the Class 1 and 2 trucks now being commercially used.

Accordingly, there exists the need for a systems approach that would allow the use of sealed lead-acid cells in Class 1–3 trucks which would satisfactorily match the performance characteristics when conventional, flooded batteries for such motive power applications are used, yet could be achieved with a minimum of cell sizes that would have to be manufactured.

It is therefore a principal object of the present invention to provide a sealed lead-acid cell tray assembly that provides superior performance for powering a vehicle requiring relatively deep depths of discharge on a repetitive cycling regime while allowing relatively complete fitment with a minimum of cell sizes that need to be manufactured.

It is a further object of this invention to provide a sealed lead-acid cell tray assembly which allows ease in manufacture, assembly and installation as well as adaptability to a wide variety of motive power applications. A related and more specific object of this invention is to provide a sealed lead-acid tray assembly that, when necessary, may be readily serviced.

Another object of the present invention is to provide a cell tray assembly that may be used in existing motive powered applications without the need to modify the space allotted for the motive power source by the truck manufacturer, i.e., the cell tray assembly of this invention may be used interchangeably with existing motive power sources.

Yet another object of this invention is to provide a cell tray assembly which utilizes two or more cell trays, yet wherein the cells on the respective trays are automatically electrically connected from one tray to the other tray or trays upon being assembled into position. A further and more specific object of this invention lies in the provision of a cell tray assembly which allows, upon assembly, a visual determination that the appropriate electrical connections have been made.

A still further object of the present invention lies in a cell tray assembly wherein a relatively large number of sealed lead-acid cells may be utilized as is necessary to provide the desired electrical performance characteristics, yet which can be treated by the user as a unitary motive power energy source.

A still further object of this invention is to provide a design approach that may be readily adapted to the many battery compartment sizes and electrical performance requirements for Class 1–3 trucks.

These and other objects and advantages of the present invention will be apparent from the following description and drawings.

SUMMARY OF THE INVENTION

In its broadest aspects, the present invention provides a modular sealed lead-acid cell tray assembly for powering any vehicle, but particularly a Class 1–3 truck, which allows an extremely broad fitment with a minimum of cell sizes. The modular tray assembly of the present invention utilizes two or more trays that may be assembled to provide what to the user can be considered a unitary motive power energy source.

A preferred embodiment of the present invention comprises a bottom tray and a top tray supported by the bottom tray. Each tray is sized to accommodate a plurality of short, sealed lead-acid cells in a vertical orientation. By utilizing a relatively large number of such cells which are electrically connected in parallel, series, or a parallel/series relationship, the electrical performance characteristics required for a wide variety of applications can be achieved with only a relatively small number of different sized cells.

In the preferred embodiment, the respective cell trays utilized can be automatically electrically connected when the top tray is assembled onto the bottom tray. Indeed, in the most preferred embodiment, the user can visually confirm that the appropriate electrical connections have been made.

DETAILED DESCRIPTION OF THE INVENTION

Figure 1:
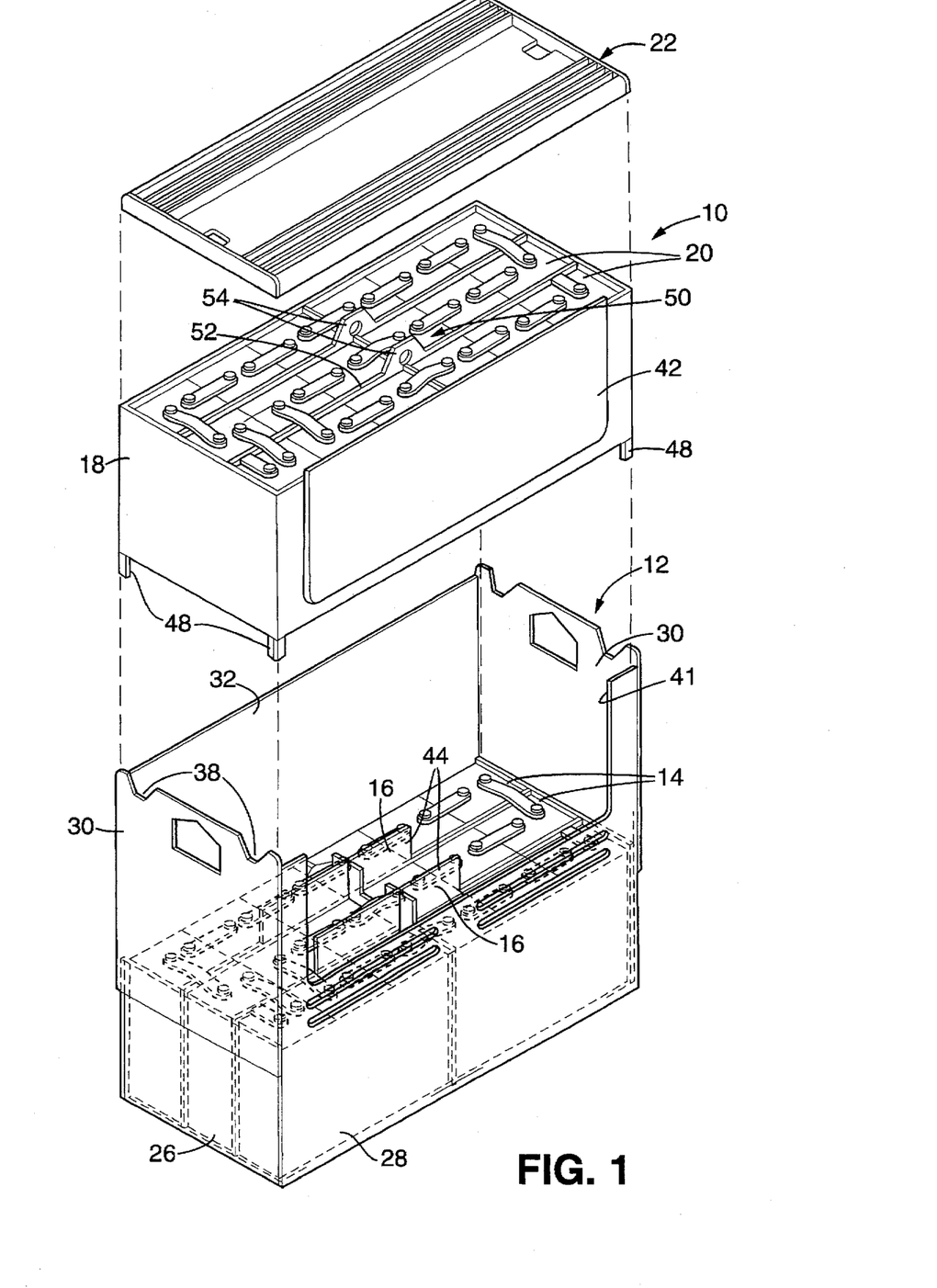
FIG. 1 is an exploded perspective view of a preferred embodiment of a sealed lead-acid tray assembly of the present invention showing a top and bottom tray with the cells in position in these trays and a cover for the assembly.

FIG. 1 illustrates a preferred embodiment of the cell tray assembly of the present invention. As shown, a cell tray assembly 10 comprises a bottom tray 12 having a first set of cells 14 positioned therein and a top tray supporting structure 16. In the illustrated cell tray assembly 10 as shown in FIG. 1, a top tray 18, including a second set of cells 20, is configured to rest upon top tray supporting structure 16 in bottom tray 12. A cover 22 serves to complete the preferred cell tray assembly 10.

Figure 2:
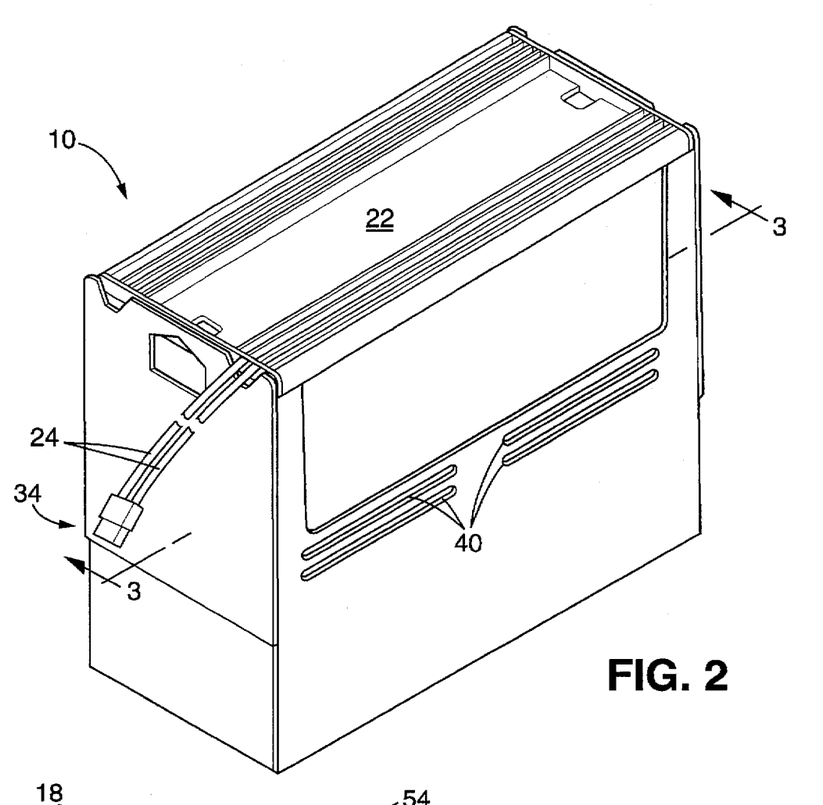
FIG. 2 is a perspective view similar to FIG. 1 and showing the cell tray assembly of FIG. 1 in its fully assembled position.

The cell tray assembly 10 in its fully assembled position is shown in FIG. 2. While a cover need not be provided, use of a cover is preferred as this will minimize or eliminate dirt and foreign objects getting to the cells, as well as essentially eliminating the possibility of short circuits.

In addition, the use of a cover for the cell tray assembly 10 furthers the perception that the cell tray assembly 10 can be functionally treated as a unitary energy source for powering motive-powered vehicles such as Class 1-3 trucks. In this regard, and as will be discussed hereinafter, due to the internal electrical connections within the cell tray assembly 10 among cells 14 20, conventional cables 24 can be utilized to electrically connect the cell tray assembly 10 to the truck being powered.

In accordance with one aspect of the preferred embodiment of the present invention, the bottom tray 12 serves as an outer tray in which the top tray or trays 18 are contained. Bottom tray 12 thus comprises a base 26, front wall 28, end or side walls 30 and a back wall 32. As can be best seen in FIGS. 1 and 3, the bottom tray 12 is configured to allow top tray 18 to be lowered into position within bottom tray 12 and has adequate space to accommodate a top tray 18. In some configurations, it may be desirable to configure bottom tray 12 so as to provide adequate space for accommodating more than one top tray 18.

The illustrative embodiment of the bottom tray 12 includes side or end walls 30 which are desirably made of steel in a thickness suitable to allow conventionally used vacuum or magnetic pullers to be employed to move the cell tray assembly in its fully assembled position as is best shown in FIG. 2. As one illustrative example, it has been found suitable to utilize steel about ¼ inch in thickness at about 10.25 inches from the bottom 26. This is generally shown at 34 in FIGS. 2 and 3.

As optional inclusions in the preferred embodiment, bottom tray 12 may be provided with lifting apertures 36 and cable egress notches 38, positioned adjacent the front wall 28, the back wall 32, or both as is illustrated. In addition, ventilation slots 40 may be provided, if desired. Indeed, if desired, and as is preferred, ventilation slots 40 can be configured and positioned so as to allow visual inspection of the cells 14 which are located adjacent front wall 28. This preferred positioning of the ventilation slots 40 allows visual confirmation that the desired electrical connections between the top and bottom trays have been made, especially when the electrical connections between the cells in each set are made to provide terminal cells that are in the row of cells adjacent the front wall of the respective tray. As may be appreciated, consistent with the objectives herein, the shape and location of the ventilation structure can be varied as desired Pursuant to one aspect of the preferred embodiment of this invention, the bottom tray 12 includes top tray aligning structure which insures that the top tray 18 will be properly located and positioned, consistent with the required internal electrical connections of the respective cells in the first and second sets. To this end, and as is shown in FIG. 1, front wall 28 is provided with a cut-out 41 configured to accept complementary shaped tongue 42 of top tray 18. The location and configuration of the locating and aligning structure of the bottom tray 12 and top tray or trays 18 may be varied as desired. More particularly, such aligning structure can be located anywhere on the bottom and top trays so long as, either during or after assembly, there is visual verification that the desired alignment has been achieved. It is preferred to locate the aligning structure indicia on the front walls so that the verification of the correct alignment is more easily seen. Providing such visual verification of the correct alignment is considered to be a substantial convenience, given the manner in which motive power sources are assembled for use in service, and in view of the considerable weight involved, as will be discussed more fully hereinafter.

A preferred aspect of the present invention is to configure and locate cut-out 41 so as to allow ease of assembly and, when necessary, maintenance. More specifically, for convenience in assembly, particularly where the front wall 28 is relatively tall, it is preferred to configure the cut-out 41 so that the assembler has sufficient access conveniently allowing for lowering the cells into the bottom tray 12 and for making the necessary electrical connections. Also, while in typical service sealed lead-acid batteries should require little or no maintenance during their service life, a suitably sized cut-out allowing ease of assembly will, of course, likewise facilitate any maintenance that may be required. To this end, it has been found suitable for these objectives to use a cut-out 41 that extends from the top of front wall 28 of bottom tray 12 to a height somewhat above the cells 14. Likewise, it has been found suitable to extend the cut-out 41 laterally across front wall 28, terminating from the juncture between the side wall 30 and the front wall 28 a distance less than the width of the cells being used.

The top tray support structure 16 must, of course, be capable of adequately supporting the top tray 18 with the second set of cells 20 contained therein. In addition, the top tray supporting structure 16 should position the top tray 18 in its assembled location so as to avoid any significant shorting concerns that might otherwise be caused by locating the top tray 18 too close to the terminals and connectors in the first set of cells 14.

Consistent with these objectives, the top tray supporting structure may be configured as desired. In the illustrative preferred embodiment of this invention, the top tray supporting structure 16 comprises upstanding supports 44 and a central cross support 46. As both seen in FIGS. 3 and 4, the various supports 44 and 46 position top tray 18 in its desired location within bottom tray 12. Also, the top tray supporting structure can be located as is desired in the bottom tray. Indeed, if desired, the top tray supporting structure 16 can be a separate structure from the bottom tray 12, and inserted into the bottom tray 12 prior to positioning the top tray 18 thereon. However, to facilitate assembly, it is preferred to weld, or otherwise attach, the top tray supporting structure to the bottom tray 12.

Feet 48 for top tray 18 are preferably provided to protect the tray-to-tray electrical connectors from possible damage. As one example, it will be desirable to include feet (or other spacing structure) so that, when the top tray rests on the ground or floor, any connector being used will be spaced from the ground or floor.

The illustrative and preferred top tray support structure 16 additionally, and desirably, functions as, in effect, partitions for the individual cells in the first set of cells 14. This facilitates proper location of the individual cells in bottom tray 12.

Figure 3:
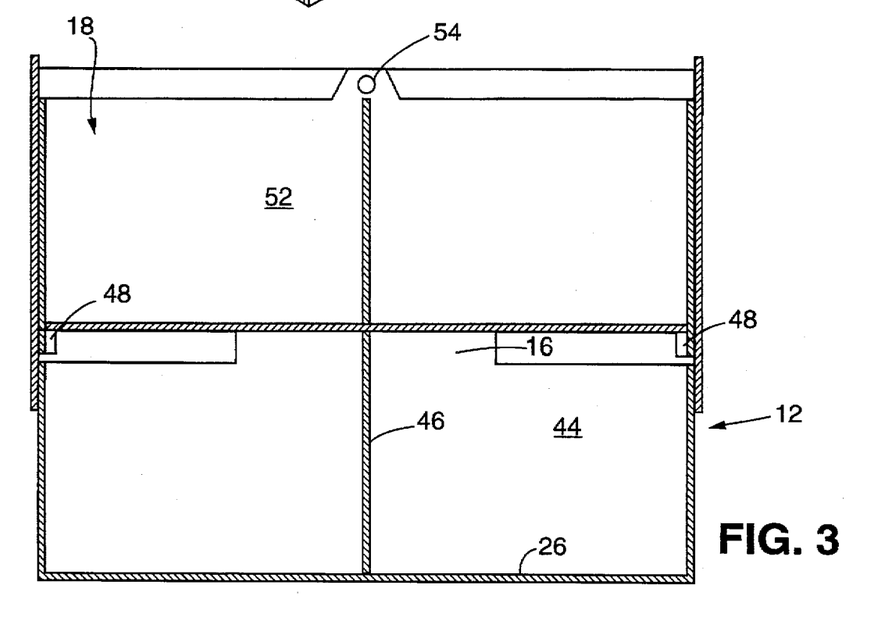
FIG. 3 is a cross-section view taken generally along line 3—3 of FIG. 2 and showing a preferred partition top tray support upon which the top tray rests.
Figure 4:
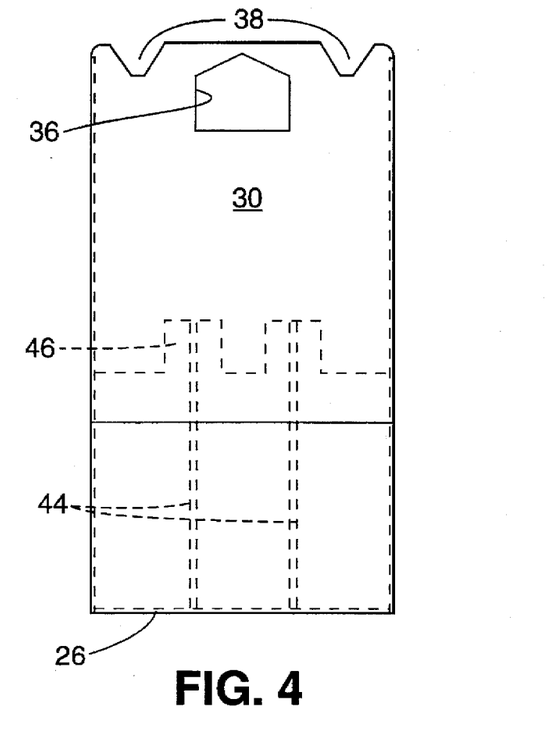
FIG. 4 is an end view of the bottom tray shown in FIG. 1 in which the positioning of the support partition is shown in phantom.

The preferred embodiment of this invention also includes lift facilitating structure for the top tray 18. More particularly, as may be appreciated, the weight of the top tray 18 when the second set of cells 20 is contained therein is considerable; and it is accordingly desirable to provide structure which will allow the top tray to be lifted or otherwise moved, either to lower the top tray 18 into position within bottom tray 12, or to remove the top tray from its assembled position. To this end, the illustrative embodiment includes (as best seen in FIGS. 1 and 3) lifting structure 50. The preferred lifting structure 50 thus comprises spaced partitions 52 having centrally located lifting ears 54. Supports 52 likewise serve as partitions to assist in the proper location of the second set of cells 20 in top tray 18.

Figure 5:
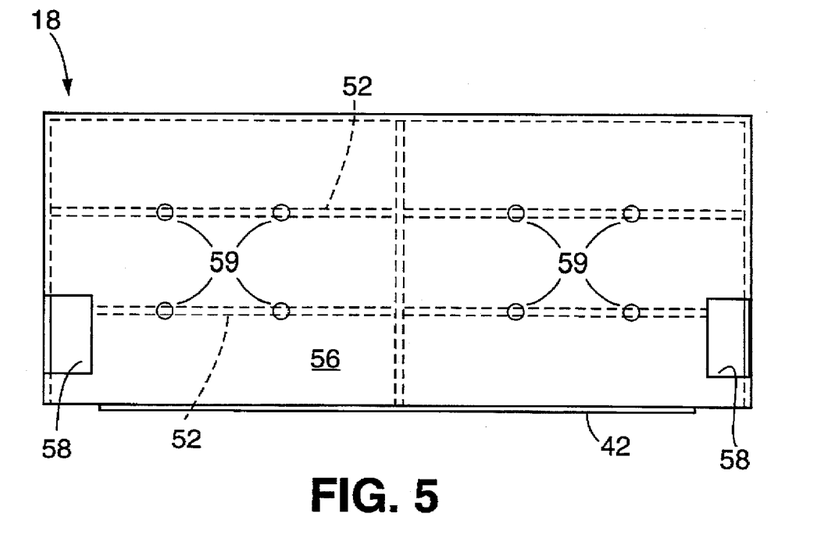
FIG. 5 is a bottom view of the top tray shown in FIG. 1 and illustrating the cut-outs allowing the sealed cells positioned in the top tray to be connected and assembled with the bottom tray.

To provide access structure to the first set of cells 14 in bottom tray 12 to provide electrical connection between the two sets of cells, the top tray base 56 (as shown in FIG. 5) is provided with access apertures 58. Positioning apertures 59 may also be included, if desired, to help disperse air when the last cell or cells 20 are lowered into the top tray 18. Such apertures or the like may also be provided in the bottom tray 12.

The electrical connections between adjacent cells can be made using any desired connector suitable for this purpose. Many suitable connectors are known. The use of epoxy-coated bolts and copper connectors are known and have been used. Burned-on connectors, as are employed with flooded lead-acid batteries, may also be used, if desired.

Further, as will be appreciated by those skilled in this art, the cell-to-cell electrical connections may be made in a variety of configurations so as to position the terminals for connection to the other set of cells, as is desired for the particular application. Similarly, the connections between individual cells can be the same for both the cells in the top and bottom trays or may be different, as desired.

Figure 6:
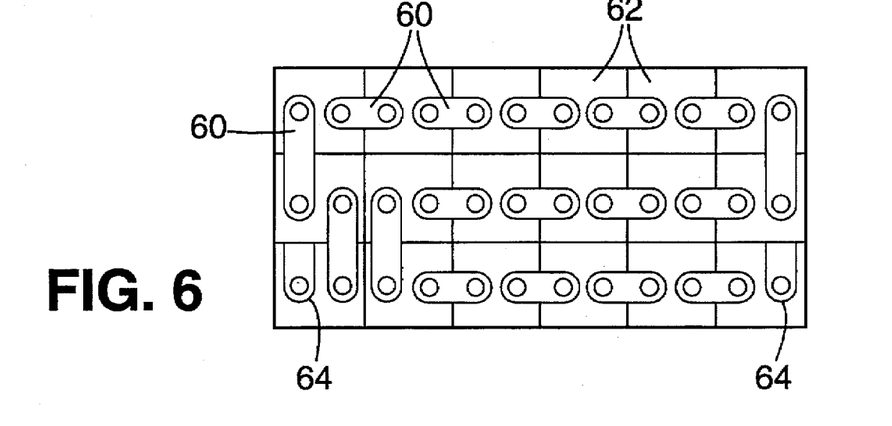
FIG. 6 is a schematic view showing the electrical connections for an 18-cell embodiment which may be made for both the cells in the top and bottom tray to provide positive and negative terminals positioned in the front of the assembly and located in the corners of the overall battery.
Figure 7:
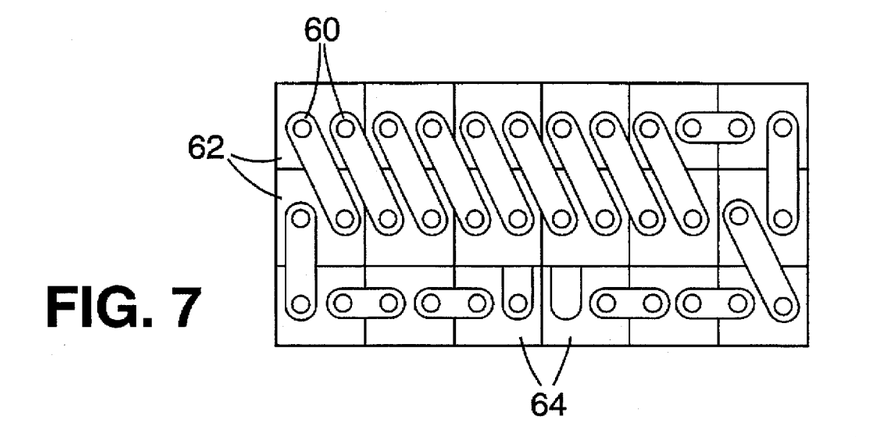
FIG. 7 is a schematic view similar to that shown in FIG. 6 and illustrating a different electrical connection scheme which results in the terminals being located in the front of the assembly and terminating from cells located in the central portion of the overall battery.
Figure 8:
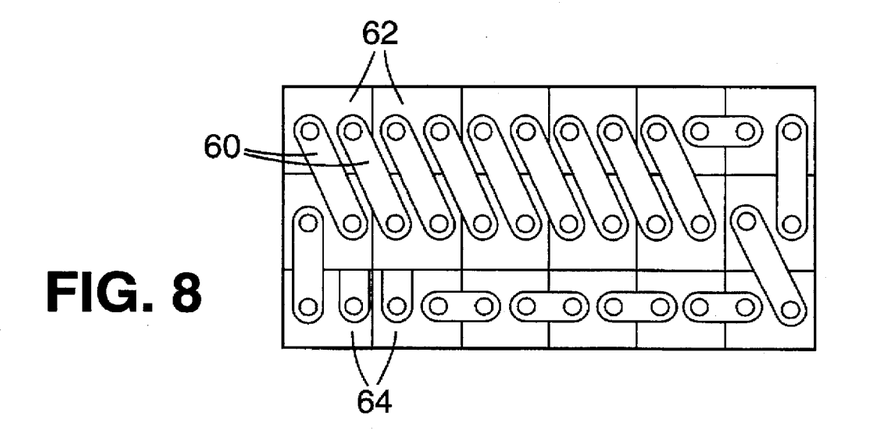
FIG. 8 is yet another schematic view similar to FIG. 6 and showing an electrical connection configuration in which the two terminals are positioned in one corner of the overall battery.

FIGS. 6 through 8 illustrate schematic views showing the electrical connections for an 18-cell embodiment which locate the positive and negative terminals differently in the three embodiments to accommodate differing requirements. Common to each embodiment is that the positioning of the positive and negative terminals that are to be connected from one tray to the other is adjacent the front wall 28 of bottom tray 12. In this fashion, as will be discussed hereinafter, confirmation that the proper connection between the respective sets of cells has been made upon installation is facilitated. As shown in FIG. 6, electrical connectors 60 connect each cell 62 together. In this configuration, the positive and negative terminals which are to be connected with the other set or sets of cells are located on the cells 62 which are adjacent the corners of the front row of cells as indicated at 64. Keeping the same element numbers of the components described in connection with FIG. 6 for ease of description, the electrical connection configuration utilized in FIG. 7 positions the respective positive and negative terminals in the center of the first set of cells as shown at 64. Likewise, in the electrical connection configuration shown in FIG. 8, the positive and negative terminals to be connected to the other set or sets of cells are located adjacent one corner of the front row of cells as indicated at 64.

As may thus be appreciated, the present invention allows substantial versatility so that the electrical connections between the respective sets of cells in the top and bottom trays may be tailored to the requirements of the particular application. Additionally, since the desired electrical connections may require series-to-series, parallel (as shown in FIGS. 6–8) or series/parallel, from one tray to the other tray or trays, there may be only one terminal cell in each set of cells; and, also the terminal cells can be located either in the first set or the second set, or more usually, in both sets. Similarly, as the location is varied, the positioning of the access apertures 58 will be varied as necessary.

Pursuant to yet another aspect of the preferred embodiment of this invention, the electrical connections between the respective sets of cells in the top and bottom trays are provided by self-locking and self-locating male and female connectors that automatically make the appropriate electrical connection as the top tray or trays are being lowered into the fully assembled position. A preferred embodiment of the male and female connector is shown in FIG. 9. As shown, connector 66 comprises an upper arm 68 connected to a terminal on one of the second set of cells 20 in top tray 18, a connecting arm 70 configured to span the cell 20 and position a lower arm 72 with connector 74 which is designed to make an automatic electrical connection as the top tray 18 is lowered into position, as can be seen from FIG. 10.

Figure 10:
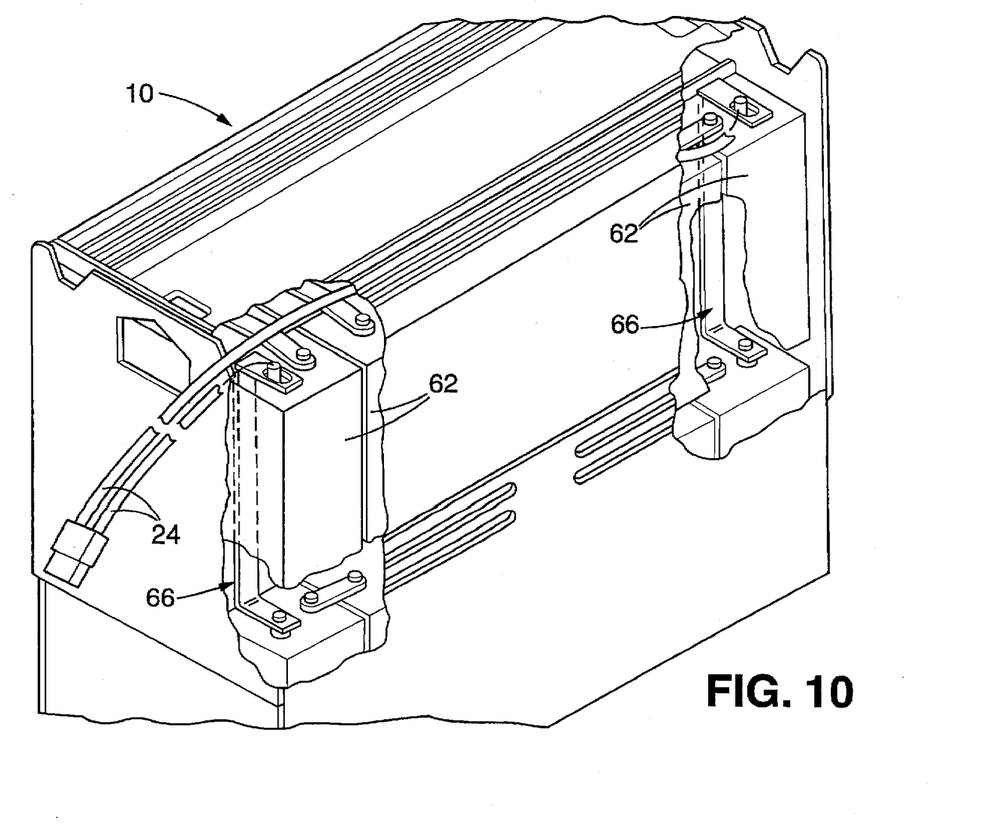
FIG. 10 is a partial perspective view of the cell tray assembly shown in FIG. 2 and partially broken away to show the connector illustrated in FIG. 9 in its assembled position.

Further, and according to another aspect of the preferred embodiment of the present invention, the electrical connections between the two sets of cells are located internally in the cell tray assembly, as can be seen in FIG. 10. Accordingly, such connections are, in effect, insulated from the external environment and any possibility of damage should be essentially eliminated.

Figure 9A:
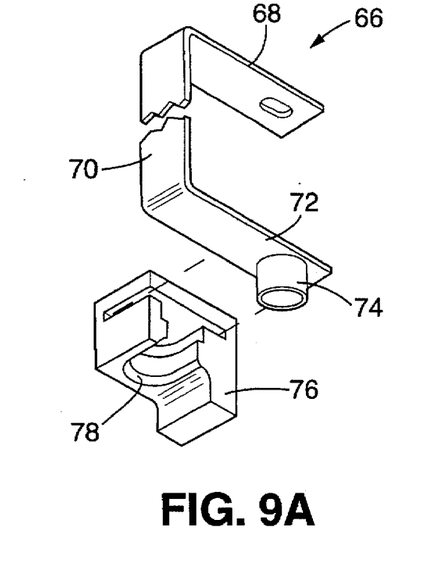
FIGS. 9A and 9B are perspective views and showing a preferred embodiment of an electrical connector to connect the cells in the top tray with those in the bottom tray, the protective shroud for the connector being illustrated in FIG. 9A in an unassembled position and in FIG. 9B in its assembled position.
Figure 9B:
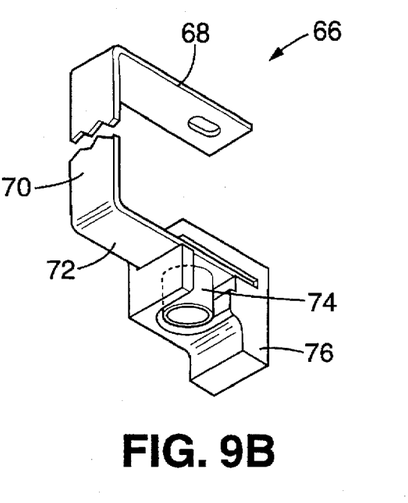

The most preferred embodiment likewise includes, as seen in FIGS. 9A and 9B, shroud 76 positioned to protect the connector 66 from undue distortion upon removing any cell from the bottom tray. More particularly, shroud 76 serves to prevent the right angle connection shown between connector 70 and bottom arm 72 from undue distortion. Similarly, in the most preferred embodiment, skirt 78 in shroud 76 facilitates the proper location of the connector portion 74 as the top tray 18 is being lowered into position.

The particular aspects of the sealed lead-acid cells employed do not form a part of the present invention. Any available sealed (or valve-regulated) lead-acid cells (often "VRLA" cells) may be used. The sealed lead-acid cell using the hybrid alloy configuration as described in U.S. Pat. No. 4,401,730 to Symborski et al. is particularly desirable.

While an 18-cell embodiment has been shown herein, the number of cells used will be dependent upon the performance requirements for the particular application. Further, as may be appreciated, the cell tray assembly of this invention can be designed to satisfy explosion-proof (EX) and spark-proof (EE) applications, as those requirements are set forth in Underwriters Laboratories standard UL-583. More particularly, to satisfy the criteria for an EE application, all that is required would be to add a masonite, or other insulation, layer to the inward side of the tray cover and on the bottom of the base of the top cover, as well as an expanded metal mesh over the tray cover openings to keep foreign objects out, and perhaps a locking device on the tray cover. To satisfy the design intention for an EX application, all that is required is a fuse box (i.e., switch) that can disconnect the cables when the tray cover is removed.

As regards the materials of construction for the cell tray assembly, any suitable material providing the requisite strength can be utilized. As an illustrative example, it has been found suitable to make the various components from hot-rolled steel. However, cold-rolled steel, composites, plastics, or other metal alloys or the like may also be used.

Figures 11, 12:
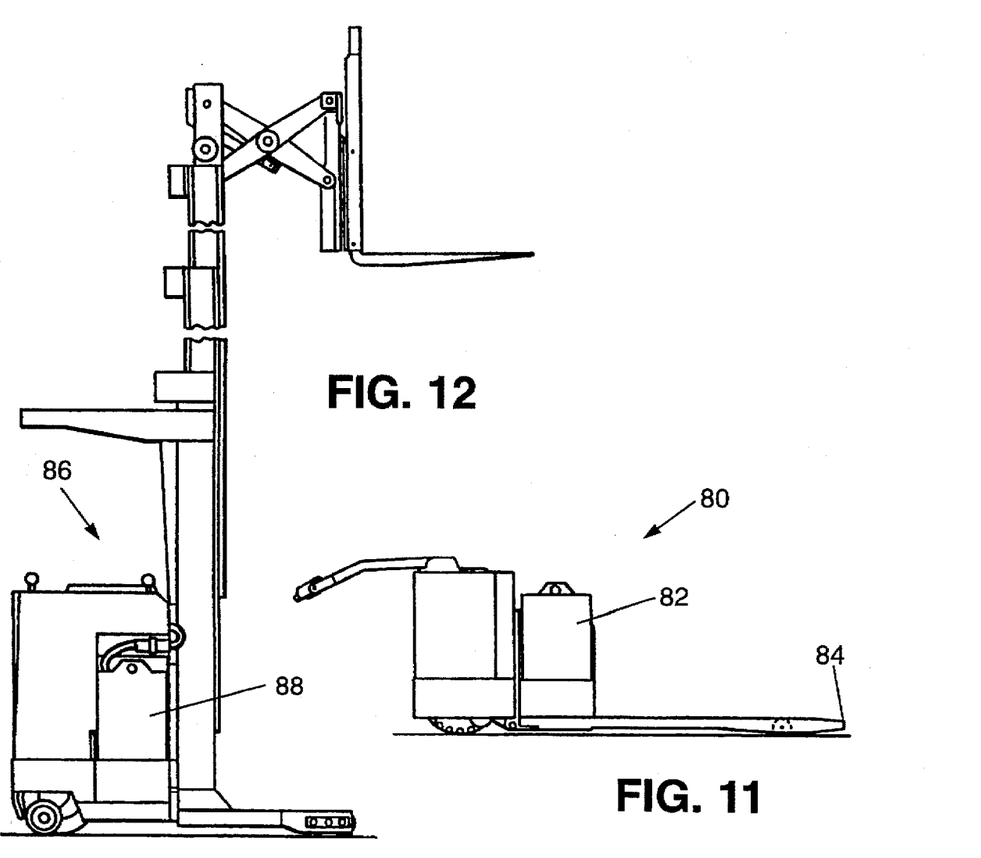
FIG. 11 is a perspective view of a Class 3 electric hand truck and showing one embodiment of the tray assembly of the present invention in position.
FIG. 12 is a perspective view of a Class 2 electric narrow aisle truck and illustrating one embodiment of the tray assembly of the present invention in position to power the truck.

The present invention provides substantial advantages when utilized as a power source for any motive-powered vehicle. Illustrative examples include automobiles, vans and the like. As has been previously discussed, Class 1–3 trucks embody particularly useful applications for the present invention, most particularly, Class 1 and 2 trucks. FIG. 11 shows an illustrative pallet jack shown generally at 80 with one embodiment of the tray assembly 10 of the present invention in position as shown at 82. While seemingly unlimited as to height dimension, it is generally required, or at least found highly desirable, for this type of application to take the height into consideration. More particularly, it will be generally useful to ensure that the height of the battery will not prevent the operator of the truck 80 from seeing the end of the forks 84.

FIG. 12 shows a Class 2 narrow aisle truck. The illustrative truck shown generally at 86 thus includes the tray assembly 10 in position, as is shown generally at 88. As can be seen, in this type of application, space limitations are present both as to height and the footprint.

Figure 13:
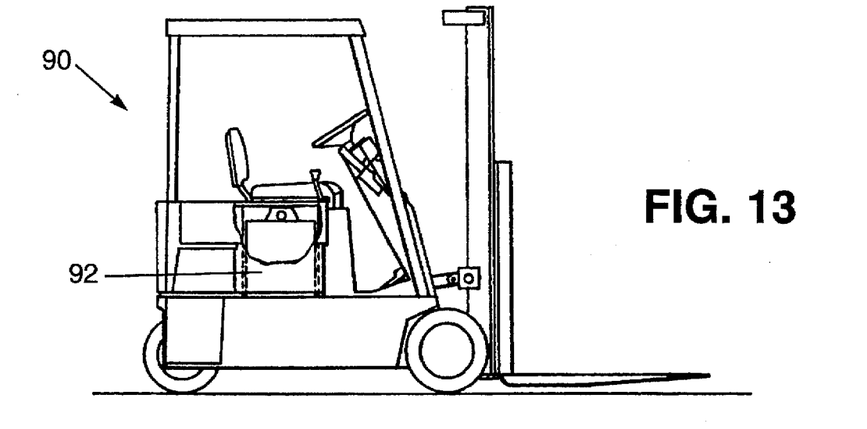
FIG. 13 is a perspective view of a Class 1 electric rider truck, partially broken away to show the position of the sealed lead-acid tray assembly of the present invention.

FIG. 13 shows the use of the present invention with an illustrative Class 1 rider truck. The tray assembly and truck shown generally at 90 is positioned in the compartment shown generally at 92. Again, as is typical of this application, there are space limitations for the motive power source.

The space considerations for the Class 1–3 trucks have been principally dictated by the space considered required for the size of a conventional flooded lead-acid battery or cells necessary to power these trucks. As discussed in the Beckley '123 patent, positioning of sealed lead-acid cells in a horizontal position has been found to provide remarkably enhanced performance under the deep discharge cycling regimes that are required for motive power applications. However, as previously noted, fitment issues are presented, particularly with respect to Class 1 and 2 trucks. Thus, providing complete fitment for such trucks would require several different-sized cells with the attendant capital costs, inventory complication and the like.

More particularly, Class 1 trucks currently, as far as is known, provide motive power source compartments having a maximum height of about 23 inches or so, while Class 2 trucks have compartments with a maximum height of about 31 inches or so. The overall weight of the motive power source is likewise important because the power source serves, in many instances, as a counterweight for the vehicle. Further, the footprints (i.e., the length and width of these compartments) vary somewhat as well. Also, the performance specifications, i.e., principally the voltage and capacity, vary. Thus, the voltages specified for Class 1 trucks will vary from about 36 volts to about 80 volts, while the specified voltages for Class 2 trucks generally vary from about 24 volts to about 80 volts. There are similarly various Ampere Hours capacities that are specified.

In accordance with the present invention, an elegant, but straightforward solution to these myriad and varying specifications is provided. Thus, it has been found that what, for convenience of reference, can be termed a double-stack of short sealed lead-acid cells can be utilized to satisfy the deep discharge cycling regimes and service life and other performance requirements for Class 1–3 trucks. Indeed, this double-stack approach using short cells (i.e., those having an overall height, including the terminals, of no more than about 14 inches or so) in the cell tray assembly of this invention can provide essentially complete fitment for Class 1 and 2 trucks with a minimum of cell sizes while satisfying the diverse electrical performance characteristics. An added, and important, advantage is that these sizes require essentially no change from the components and sealed cells that are currently being used for other applications, thereby further simplifying the capital costs and inventory issues. More particularly, for Class 1 trucks, it has been found that the necessary requirements can be satisfied by utilizing sealed cells having an overall height of about 10½ inches with a positive plate of a size having a nominal per plate capacity of about 34 Ampere Hours ("AH"). Such plates are only slightly smaller than the conventional 35 AH plates used for other applications. The respective components can be cut down in a straightforward fashion to provide a suitable cell without undue capital investment or inventory complication. For Class 2 trucks, it has been found that a sealed lead-acid cell having an overall height of about 14 inches, and using a positive plate having a nominal capacity of about 50 AH, will achieve in the double-stack arrangement of this invention, complete fitment while meeting the necessary performance criteria.

Thus, with the sized plates having a given height and per plate AH capacity, fitment is provided by, in the usual case, optimizing the AH capacity that can be obtained with the other dimensions of the compartment size (i.e., length and width). The AH capacity of each Cell (34 or 50 AH multiplied by the number of positive plates used) is selected by determining the depth of the cell desired, coordinating the depth with the orientation of cells within the compartment as necessary to maximize the AH capacity that can be achieved using the tray assembly of this invention.

As discussed herein, it has been found that using this approach, complete fitment for Class 1 and 2 trucks can be satisfied by the two positive plate sizes, taking advantage of existing tooling that can provide cells with a wide variance in the number of positive plates. The fitment issue thus can be resolved using tooling any sealed lead-acid battery manufacturer should possess for other applications and the efficient space utilization achieved by the cell tray assembly of this invention.

The height and capacity of the cells useful in the present invention are limited by the current sizes of the motive power source compartments used by the vehicle manufacturers and by the capacity that can be provided by battery manufacturers for such short cells. However, in keeping with the present invention as compartment sizes change and manufacturing capabilities are improved, suitable short cells may have heights of up to 15 or, perhaps even, 16 inches with enhanced capacities. Similarly, while the nominal rated capacities of the cells used herein can be up to about 34 AH per positive plate (for Class 1 trucks) and up to about 50 AH per positive plate (for Class 2 trucks), such capacities will not only vary somewhat depending upon how the rated capacity is set, but also improved and optimized cell configurations should be capable of enhancing the capacities, respectively, up to about 40 AH or so, and 50 to 60 AH or so, each being per positive plate.

Further, the use of the short sealed lead-acid cells in the double-stack orientation of the present invention should be more efficient, especially at high rated discharges, in comparison to using conventional flooded lead-acid batteries. This is quite important since many Class 1 and 2 trucks can encounter some very high power demands, particularly when such trucks are lifting heavy pallets into the air. Even further, when appropriate, the use of a parallel connection can provide the battery system with redundancy so that an open cell failure in a particular cell will still allow the truck to operate, albeit with somewhat reduced capacity. This is a further and important advantage of use of the sealed lead-acid cell tray assembly of the present invention in comparison to the use of conventional flooded lead-acid batteries.

The cell tray assembly of the present invention also simplifies assembly and, where necessary, maintenance. Thus, in assembly, by providing a separate tray for each set of cells, the ultimate assembly to achieve the necessary double-stack arrangement is simplified. Likewise, the manual installation and electrical connections within each set of cells is facilitated. The ability to handle a relatively large number of cells, using the tray approach, is particularly important when it is appreciated that the weight involved is substantial. Quite often, the total weight of the cell tray assembly will exceed 2,000 pounds, usually much more than that.

In such applications, it is immensely important to be able to use forklift trucks and the like when a fully loaded top tray needs to be moved into, or out of, its assembled position. Removing the top tray in this fashion thus simplifies maintenance, replacement or just examining, for whatever reason, the cells located in the bottom tray without, in the preferred embodiment of the present invention, even having to undo any connections. The enclosed top tray configuration in the preferred embodiment of this invention insures that the cells therein will be held in place.

Figure 14:
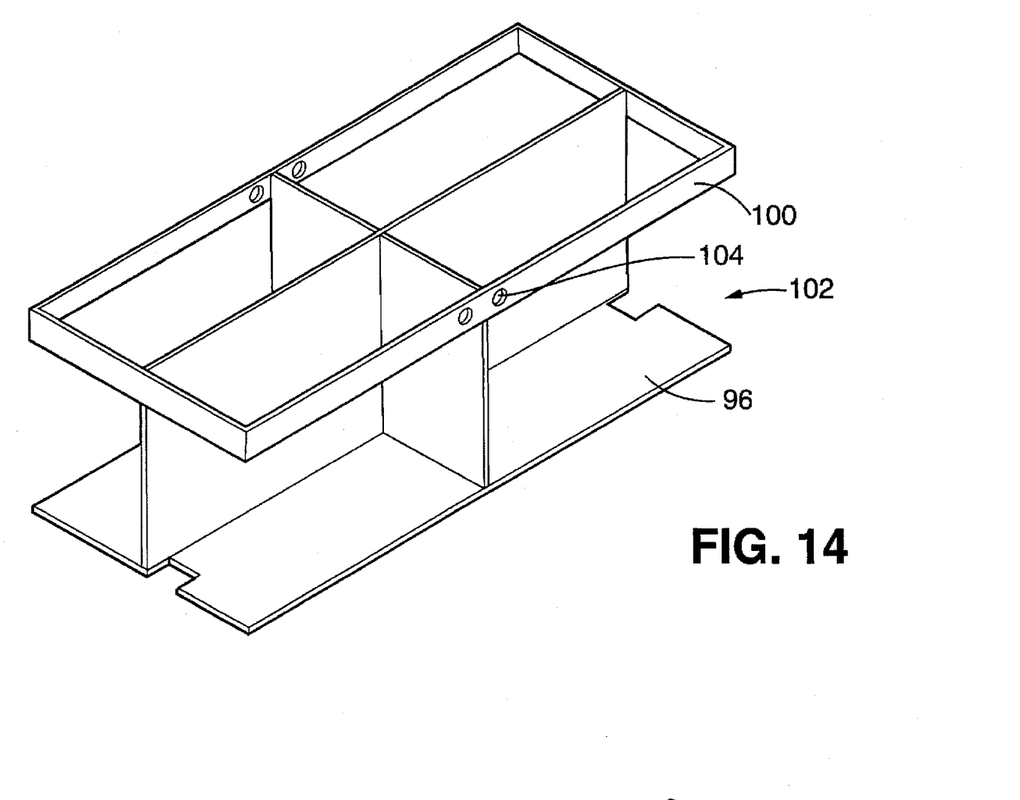
FIG. 14 is a perspective view and illustrating an alternative embodiment of a top tray that may be used in the cell tray assembly of this invention.

However, it might be suitable for some applications to employ a simplified top tray which includes less cell restraint than in the preferred embodiment illustrated herein. One alternative embodiment of a top tray configuration is shown in FIG. 14. As seen, the simplified top tray structure comprises a tray base 96, a tray band 98 and a tray band support, shown generally at 102. Lift structure 104 is provided in band 98, as shown. Cell restraint is provided by band 98. Due to the weight of the cell-loaded tray, whatever top tray structure is used should include lifting holes or the like.

Figure 15:
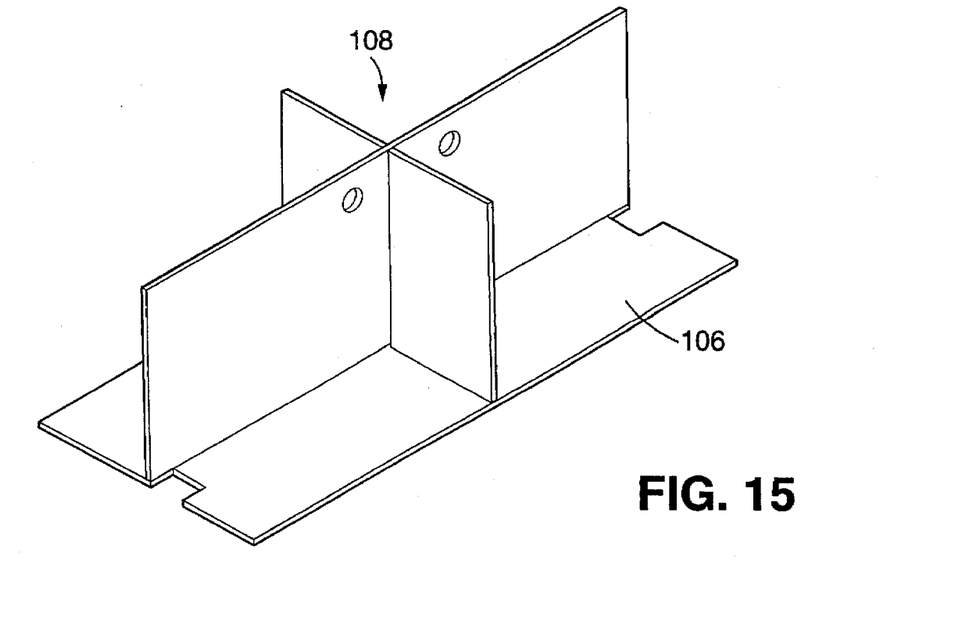
FIG. 15 is a perspective view and showing yet another alternative embodiment of a top tray that may be used in the cell tray assembly of this invention.

FIG. 15 provides an even simpler top tray structure that not only eliminates the side walls of the top tray used in the preferred embodiment, but also the band 98 of the alternative top tray shown in FIG. 14. Thus, the alternative top tray embodiment illustrated in FIG. 15 includes only a tray base 106 and upstanding internal wall members 108. Cell restraint is provided, simply by wall members 108 and end walls 30, side walls 32 and 28 in tray 12 of FIG. 1. While lacking the desirable features of the preferred embodiment of the present invention, this simplified top tray arrangement shown in FIG. 15 may satisfy the requirements for some applications. Indeed, while sacrificing many of the important advantages that can be achieved herein, it may be suitable for some applications to utilize a double-stack arrangement in which the top tray support structure is provided by the combination of the cells in the bottom tray and load-bearing spacers positioned between the top set of cells and the lower first set of cells to insure that the terminals on this lower first set are suitably spaced from the bottom of the cells they are supporting. The top tray in this configuration comprises the spacers.

Further, while it will generally be desired to utilize all of the space in the respective trays, it is within the scope of the present invention to leave space unoccupied by cells where unneeded to satisfy the requirements of the particular application. In such instances, it may be desirable to partition the space occupied by cells from the space not required by including steel partitions, positioned as necessary.

The present invention thus provides a cell tray assembly that offers, from the standpoint of the user, important performance advantages, as well as the versatility to tailor the capacity and other performance requirements to a particular application. From the standpoint of the battery manufacturer, the present invention provides a simplified and economic system for satisfying a wide variety of requirements with a simplified and efficient inventory of sealed lead-acid cells.

What is claimed is:

1. A sealed lead-acid cell tray assembly mounted on a motive-powered vehicle having a motive power source compartment and the cell tray assembly being disposed in the motive power source compartment of said vehicle, which cell tray assembly comprises a bottom tray comprising a base, a front and back wall, and side walls connecting the front and back walls to define a lower cell-receiving space and an upper cell-receiving space, a first set of short sealed lead-acid cells each having a positive and negative terminal vertically positioned in said lower cell-receiving space, the respective terminals of each of the sealed lead-acid cells in said first set having electrical connections to provide at least one terminal cell for said first set, a top tray comprising a base, a front and back wall and side walls connecting the front and back walls to define a cell-receiving space, a second set of short sealed lead-acid cells each having a positive and negative terminal vertically positioned in said cell-receiving space, the respective terminals of each of the sealed lead-acid cells comprising said second set having electrical connections providing at least one second set terminal cell, a top tray support structure being positioned in said bottom tray, said top tray being positioned in the upper cell-receiving space of said bottom tray and being supported by said top tray support structure and being removable therefrom, the positive and negative terminals of the respective terminal cells of said first set being connected with the respective terminals of the terminal cells of said second set to provide a power source for powering said motive-powered vehicle.

2. The sealed lead-acid cell tray assembly of claim 1, wherein each of said top and bottom trays includes assembly indicia identifying the desired assembly position of the bottom tray upon the top tray.

3. The sealed lead-acid cell tray assembly of claim 2, wherein said assembly indicia on said bottom tray comprises a cut-out on the front wall and the assembly indicia on said top tray comprises a tongue portion fitting together with the cut-out of the bottom tray to provide a composite front wall for said cell tray assembly.

4. The sealed lead-acid cell tray assembly of claim 3, wherein said cut-out of said bottom tray extends down the front wall of said bottom tray to allow insertion of a cell therethrough for positioning said first set of sealed lead-acid cells in said bottom tray.

5. The sealed lead-acid cell tray assembly of claim 4, wherein the terminals cells of each of said first and second sets of sealed lead-acid cells are positioned adjacent the front wall of each of said bottom and top trays, respectively, and the respective terminals in said terminal cells are connected by a connector which completes the electrical connection upon assembly of the top tray upon said top tray support structure.

6. The sealed lead-acid cell tray assembly of claim 1, wherein said first set of sealed lead-acid cells are positioned in a plurality of rows and said top tray support structure comprises upstanding supports separating the rows of cells from one another and a cross support positioned between the upstanding supports.

7. The sealed lead-acid cell tray assembly of claim 6, wherein said upstanding and cross supports space the base of said top tray from the respective terminals of the first set of sealed lead-acid cells.

8. The sealed lead-acid cell tray assembly of claim 1, wherein said bottom tray includes a plurality of ventilation apertures positioned to allow visual inspection of the electrical connections between the first and second sets of cells.

9. The sealed lead-acid cell tray assembly of claim 1, wherein said bottom tray includes lifting ears capable of allowing the sealed lead-acid tray assembly to be lifted by a motive-powered vehicle.

10. The sealed lead-acid cell tray assembly of claim 1, wherein at least one wall comprising said bottom tray is configured to allow movement by a vacuum or magnetic puller.

11. The sealed lead-acid cell tray assembly of claim 1, wherein said top tray support structure comprises upstanding supports and a cross support and said top tray includes spacing structure to space the base of said top tray from any surface upon which said top tray rests a distance adequate to prevent contact between an electrical connector and said surface.

12. The sealed lead-acid cell tray assembly of claim 1, wherein said top tray includes lift structure allowing said top tray to be lifted and moved as a unit.

13. The sealed lead-acid cell tray assembly of claim 1, which includes a cover enclosing said top tray and the second set of cells.

14. The sealed lead-acid cell tray assembly of claim 1, wherein said motive-powered vehicle is an electric rider truck and each of said sealed lead-acid cells comprising said first and second sets has a height of no more than about 10½ inches and includes positive plates having a per plate capacity of up to about 34 Ampere Hours.

15. The sealed lead-acid cell tray assembly of claim 1, wherein said motive-powered vehicle is an electronic narrow aisle truck and each of said sealed lead-acid cells in said first and second sets has a height of no more than about 14 inches and includes positive plates having a per plate capacity of up to about 50 Ampere Hours.

16. The sealed lead-acid cell tray assembly of claim 1 wherein the electrical connections between the respective terminal cells in said first and second sets are positioned internally within said tray assembly and said top tray includes access apertures through which the electrical connection is made.

17. The sealed lead-acid cell tray assembly of claim 16, in which the electrical connection between the first and second sets of sealed lead-acid cells comprises self-locking and self-locating male and female connectors automatically completing the electrical connections as the top tray is being assembled into position on said bottom tray.

18. A sealed lead-acid cell tray assembly mounted on a motive-powered vehicle having a motive power source compartment and the cell tray assembly being disposed in the motive power source compartment of said vehicle, which cell tray assembly comprises a bottom tray comprising a base, a front and back wall, and side walls connecting the front and back walls to define a lower cell-receiving space and an upper cell-receiving space, a first set of short sealed lead-acid cells each having a positive and negative terminal vertically positioned in said lower cell-receiving space, the respective terminals of each of the sealed lead-acid cells in said first set being electrically connected together to provide at lease least one terminal cell for said first set, a top tray comprising a base and upstanding walls defining a cell-receiving space, a second set of short sealed lead-acid cells each having a positive and negative terminal vertically positioned in said cell-receiving space, the respective terminals of each of the sealed lead-acid cells comprising said second set being electrically connected to provide at least one second set terminal cell, a top tray support structure being positioned in said bottom tray, said top tray being positioned in the upper cell-receiving space of said bottom tray and being supported by said top tray support structure, the positive and negative terminals of the respective terminal cells of said first set being connected with the respective terminals of the terminal cells of said second set to provide a power source for powering said motive-powered vehicle.

19. A sealed lead-acid cell tray assembly mounted on a motive-powered vehicle having a motive power source compartment and the cell tray assembly being disposed in the motive power source compartment of said vehicle, which cell tray assembly comprises a bottom tray comprising a base, a front and back wall, and side walls connecting the front and back walls to define a lower cell-receiving space and an upper cell-receiving space, a first set of short sealed lead-acid cells each having a positive and negative terminal vertically positioned in said lower cell-receiving space, the respective terminals of each of the sealed lead-acid cells in said first set being electrically connected together to provide at least one terminal cell for said first set, a top tray comprising a base, a band and upstanding walls connecting the base and band to define a cell-receiving space, a second set of short sealed lead-acid cells each having a positive and negative terminal vertically positioned in said cell-receiving space, the respective terminals of each of the sealed lead-acid cells comprising said second set being electrically connected to provide at least one second set terminal cell, said band having a lip to restrain at least some of said cells in said second set from movement, a top tray support structure being positioned in said bottom tray, said top tray being positioned in the upper cell-receiving space of said bottom tray and being supported by said top tray support structure, the positive and negative terminals of the respective terminal cells of said first set being connected with the respective terminals of the terminal cells of said second set to provide a power source for powering said motive-powered vehicle.

20. A sealed lead-acid cell tray assembly mounted on an electric rider or narrow aisle motive-powered truck having a motive power source compartment and the cell tray assembly being disposed in the motive power source compartment of said truck, which cell tray assembly comprises a bottom tray comprising a base, a front and back wall, and side walls connecting the front and back walls to define a lower cell-receiving space and an upper cell-receiving space, a first set of sealed lead-acid cells each having a positive and negative terminal vertically positioned in said lower cell-receiving space and having a height of no more than about 14 inches, the respective terminals of each of the sealed lead-acid cells in said first set being electrically connected together to provide at least one terminal cell for said first set, a top tray comprising a base, a front and back wall and side walls connecting the front and back walls to define a cell-receiving space, a second set of sealed lead-acid cells each having a positive and negative terminal vertically positioned in said cell-receiving space and having a height of no more than about 14 inches, the respective terminals of each of the sealed lead-acid cells comprising said second set being electrically connected to provide at least one second set terminal cell, a top tray support structure being positioned in said bottom tray, said top tray being positioned in the upper cell-receiving space of said bottom tray and being supported by said top tray support structure, the positive and negative terminals of the respective terminal cells of said first set being connected with the respective terminals of the terminal cells of said second set to provide a power source for powering said motive-powered truck and having a voltage of from about 24 to about 80 volts.

* * * * *